July 19, 1927.
W. E. WILLIAMS
TUBULAR SPOKED WHEEL
Filed Aug. 1, 1922
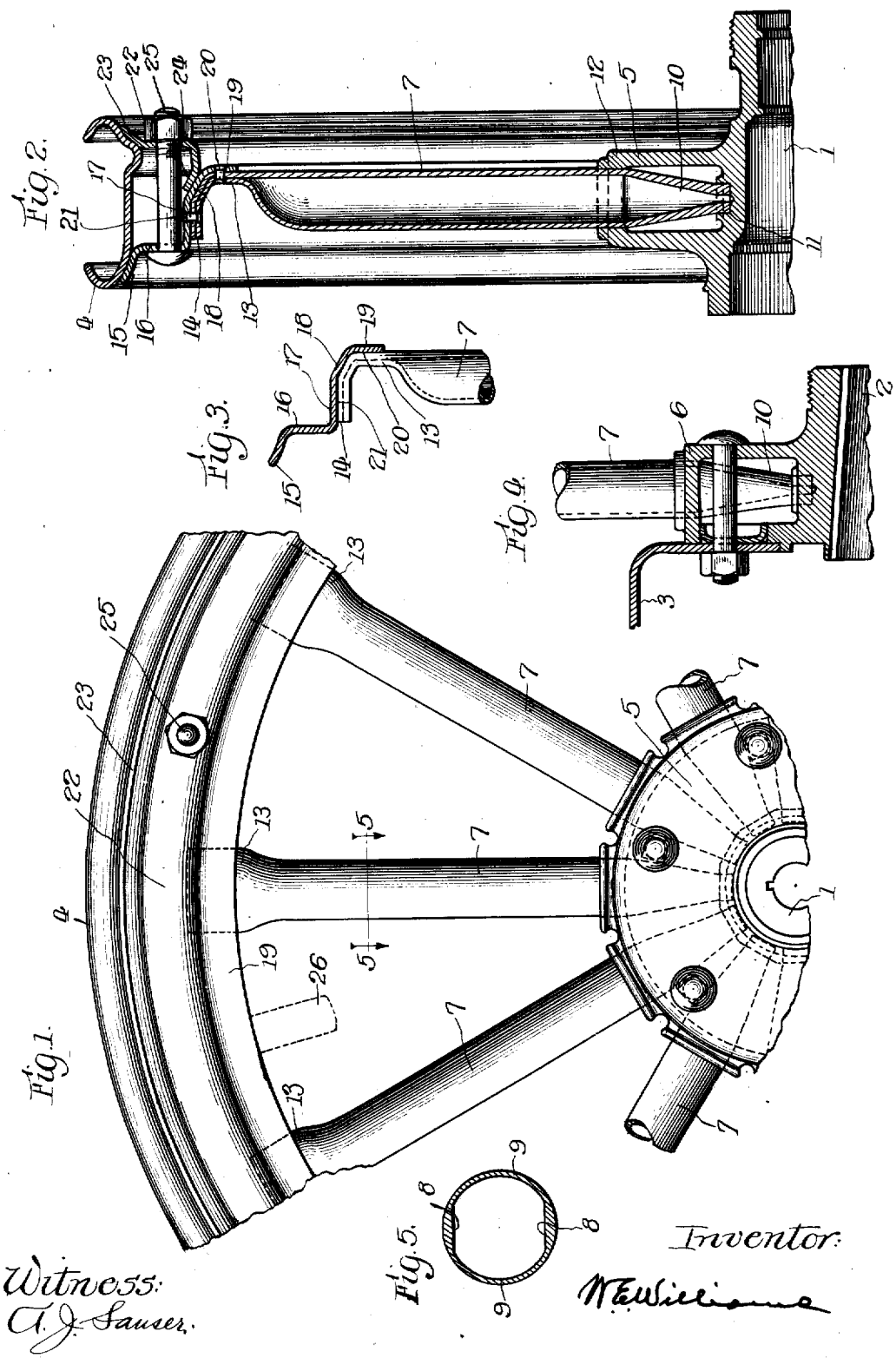

Patented July 19, 1927.

1,636,541

UNITED STATES PATENT OFFICE.

WILLIAM ERASTUS WILLIAMS, OF WILMETTE, ILLINOIS, ASSIGNOR TO AMERICAN STEEL FOUNDRIES, OF CHICAGO, ILLINOIS, A CORPORATION OF NEW JERSEY.

TUBULAR-SPOKED WHEEL.

Application filed August 1, 1922. Serial No. 579,016.

The object of my invention is to provide a tubular spoked wheel, having a peculiarly designed rim adapted to be fastened to tubular spokes, and a special shaped cross section of a spoke adapted to sustain the greatest shocks with the least metal involved in the spokes.

Reference will be had to the accompanying drawings, in which

Figure 1, is a front elevation of a portion of a wheel.

Figure 2, is a radial sectional elevation of a portion of a wheel.

Figure 3, is a cross section of a portion of the felloe or fixed rim.

Figure 4, is a transverse section through the hub portion showing a modified construction.

Figure 5, is a cross section of the spoke.

In the drawing, the reference numeral 1 indicates the hub of a front wheel for an automobile, 2 the rear hub, 3 the ordinary brake drum, 4 a pneumatic tire rim which is here shown as a clincher but which may be of any other suitable type, while 5 indicates the hub flange body for the front wheel, and 6 the hub flange body for the rear wheel.

The spokes 7 have thickened front and rear wall portions indicated by the numeral 8 and thin side wall portions indicated at 9, best shown in Fig. 5.

These spokes have swaged tapered ends, indicated by 10, which are set at 11 into round holes in the hub body. The spokes are pressed into apertures in this hub body at the region 12 of the hub body.

The outer ends of the tubular spokes are collapsed and flattened, as is indicated by 13, and are turned over into horizontal ends, indicated by 14, and there is mounted thereon a felloe or fixed rim ring having a flange 15, which bears directly under one side of the demountable rim 4, and another vertical flange or web 16. The flange 16 is turned over into a horizontal section 17, and this is merged into an inclined portion 18, and this in turn is merged into an inturned vertical flange 19. The portions 13 to 14 inclusive of the spoke ends, fit snugly into a bearing within the portion 17, 18 and 19 of the felloe, and are spot welded or riveted through at 20 and 21.

A wedge retaining ring 22, furnishes a support at 23 for the other or front side of the demountable rim, 4. This retaining ring 22 has an inclined wedging surface 24, which bears on the surface 18 of the felloe or fixed rim. A series of bolts 25, pass through the vertical flange 16 of the felloe, and pass through the wedge ring 22, and clamp the same into a working position.

In the manufacture of these wheels, the tubing is first made having the cross section shown in Figure 5. This tubing is swaged down on the inner ends and pressed into the hub, making a spider, and the location of these tubes is such that the thick walls 8 are at the front and the rear faces of the tubes, in order to sustain the skid shocks involved on the wheels. It is only essential that the thickened portion 8 be either approximately parallel to or perpendicular to the plane of the wheel so that the extra metal may resist one of the two common skid strains. And since as has been said, the thickening is from end to end of the tube used, the extra metal obviously increases the strength of the flattened portion. The outer ends of the spokes are collapsed, as previously described, and then are pressed tightly into the felloe or fixed rim and after being pressed are secured by the spot welds or rivets, as may be desired for making a permanent fastening of the spokes at the felloe.

A felloe or fixed rim as indicated, amounts substantially to an angular bar section, and the retaining ring 22 amounts to that of a wedge ring.

The air valve stem is indicated by 26 which passes through an aperture in the steel felloe.

What I claim is:—

1. In a wheel, the combination with a metal rim having a cylindrical flange, of a series of tubular metal spokes each of unitary construction thickened on two sides from end to end, having its outer end portion flattened and bent laterally to fit the rim, and means for rigidly uniting each flattened portion to the rim.

2. In a wheel, the combination with a fixed rim, of a series of tubular spokes each of unitary construction having two opposite sides of its wall thicker than the intermediate portions and with its outer end portion flattened and rigidly fixed to the rim.

Signed at Chicago in the county of Cook and State of Illinois, this 13th day of July, 1922.

WILLIAM ERASTUS WILLIAMS.

rim, and means for rigidly uniting each flattened portion to the rim.

2. In a wheel, the combination with a fixed rim, of a series of tubular spokes each of unitary construction having two opposite sides of its wall thicker than the intermediate portions and with its outer end portion flattened and rigidly fixed to the rim.

Signed at Chicago in the county of Cook and State of Illinois, this 13th day of July, 1922.

WILLIAM ERASTUS WILLIAMS.

CERTIFICATE OF CORRECTION.

Patent No. 1,636,541.  Granted July 19, 1927, to

WILLIAM ERASTUS WILLIAMS.

It is hereby certified that the above numbered patent was erroneously issued to "American Steel Foundries, of Chicago, Illinois," a corporation of New Jersey, whereas said patent should have been issued to "Steel Wheel Corporation, of Lansing, Michigan," a corporation of Michigan, said corporation being assignee, by mesne assignments, of the entire interest in said invention, as shown by the records of assignments in this office; and that the said Letters Patent should be read with this correction therein that the same may conform to the record of the case in the Patent Office.

Signed and sealed this 18th day of October, A. D. 1927.

Seal.

M. J. Moore,
Acting Commissioner of Patents.

CERTIFICATE OF CORRECTION.

Patent No. 1,636,541. Granted July 19, 1927, to

WILLIAM ERASTUS WILLIAMS.

It is hereby certified that the above numbered patent was erroneously issued to "American Steel Foundries, of Chicago, Illinois," a corporation of New Jersey, whereas said patent should have been issued to "Steel Wheel Corporation, of Lansing, Michigan," a corporation of Michigan, said corporation being assignee, by mesne assignments, of the entire interest in said invention, as shown by the records of assignments in this office; and that the said Letters Patent should be read with this correction therein that the same may conform to the record of the case in the Patent Office.

Signed and sealed this 18th day of October, A. D. 1927.

Seal.

M. J. Moore,
Acting Commissioner of Patents.